July 15, 1958  L. A. KIRSCHNER  2,843,146
DRAIN TRAP AND MEANS FOR LOCKING SAME TO THE WASTE PIPE
Filed Nov. 28, 1955
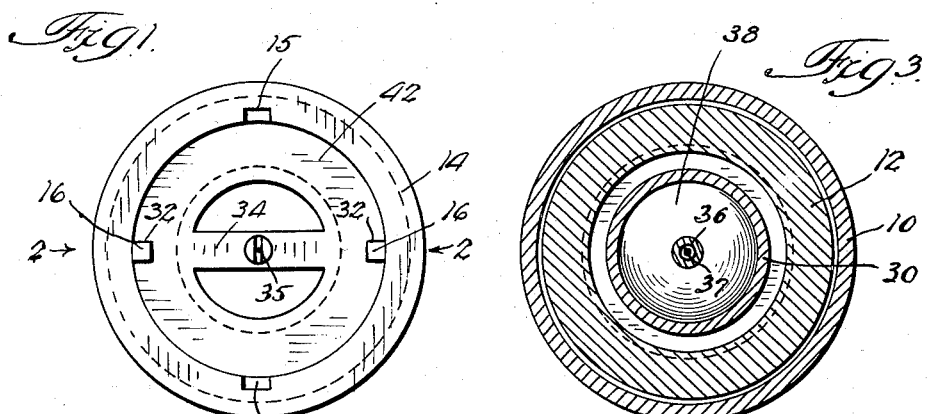
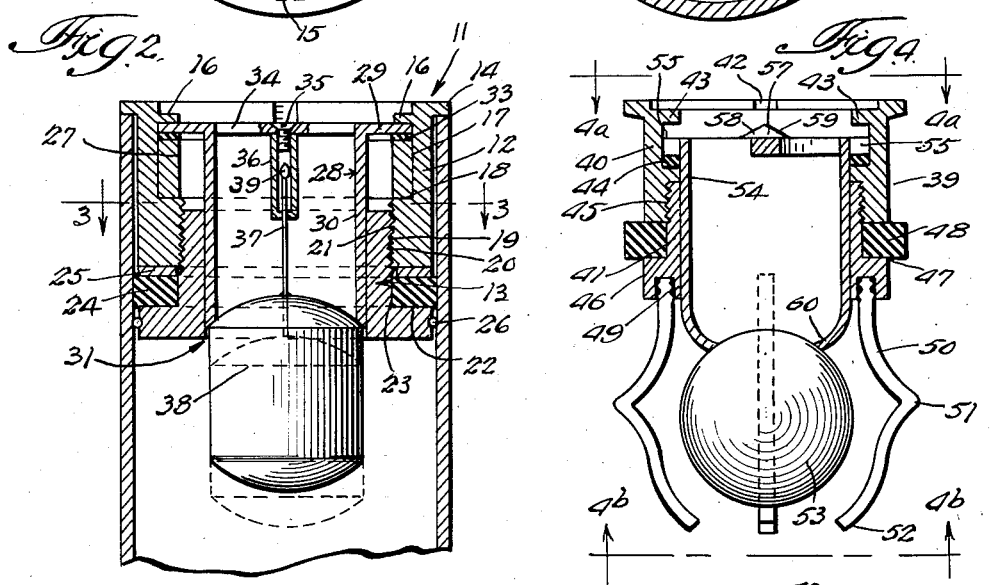
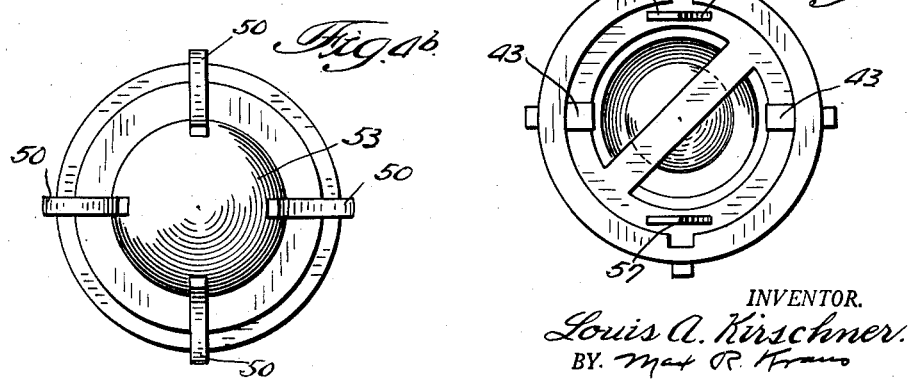
INVENTOR.
Louis A. Kirschner
BY Max R. Kraus United States Patent Office 2,843,146
Patented July 15, 1958

2,843,146

DRAIN TRAP AND MEANS FOR LOCKING SAME TO THE WASTE PIPE

Louis A. Kirschner, Chicago, Ill.

Application November 28, 1955, Serial No. 549,454

4 Claims. (Cl. 137—433)

This invention relates to drain traps for use in automatically preventing any back flow through the traps or waste pipe, although permitting unrestricted normal passage of the water through the waste pipe into the sewer.

One of the objects of this invention is to provide a drain trap unit which may be readily secured to the waste pipe and locked thereto by the use of an expansion gasket which serves to frictionally hold the drain trap unit to the waste pipe.

Another object is to provide a drain trap unit employing a check valve which may be readily and quickly installed by any inexperienced person with a simple tool, which does not require the threading of any pipes or the use of extraneous locking means at the point of installation and which does not require the breaking of the concrete in the basement floor either for the removal of presently used facilities and substitution of the present invention and which permits the present invention to be installed in any present drain pipe.

Another object of this invention is to provide a means by which a check valve can be placed into an existing cellar drain, irrespective of whether or not that drain has special facilities such as threads or locking pins or any other means, by providing an expansion gasket which when compressed engages the wall of the drainpipe to lock the housing in said drain pipe. The float valve mechanism which is supported in said housing is so constructed that it may be readily locked in said housing by simply turning same with respect to the housing and readily removed in like manner.

In order to install a check valve under present day methods it is necessary to break the concrete in a basement floor and remove the existing facilities and replace the drain pipe in order to support the check valve for said check valves are supported in specially constructed housings containing threads or other locking means, which must cooperate with the waste or drain pipe. With the present invention it is not necessary to remove existing drain pipes for the housing may be readily secured thereto by compressing the expansion gasket. With the present day devices employing check valves it is necessary when repairing the check valve to break the concrete and also to destroy the old unit due to the fact that the threaded portions corrode by the passage of water, making it expensive and necessary to employ the services of a plumber.

With this invention all this is eliminated. The housing can be readily inserted in the pipe and retained by the compression gasket. It can be removed from the drain pipe by releasing the pressure of the compression gasket against the drain pipe. The check valve may be readily inserted and readily removed from the housing by the simple process of turning same.

This invention is applicable and may be used with equal facility in sinks, laundry tubs, bathtubs and anywhere where a device is needed to prevent the backing up of drain water.

In the drawings:

Fig. 1 is a top plan view of one form of the device.

Fig. 2 is a vertical cross sectional view taken on line 2—2 of Fig. 1.

Fig. 3 is a cross sectional view taken on line 3—3 of Fig. 2.

Fig. 4 is a vertical cross sectional view of a modified construction.

Fig. 4a is a plan view taken on line 4a—4a of Fig. 4.

Fig. 4b is a view taken on the line 4b—4b of Fig. 4.

Secured to the inlet end of the drain pipe 10 is a housing member generally indicated at 11 which is formed of an upper portion or fitting generally indicated at 12 and a lower portion or collar indicated at 13 in threaded engagement therewith. The upper portion has an annular flange 14 which rests on the top of the drain pipe 10. The fitting has a pair of diametrically opposed slots 15 to be engaged by a tightening tool as will be subsequently explained. The fitting 12 also has a pair of diametrically opposed inwardly directed projections or ears 16 positioned below the top of the fitting. The fitting has an enlarged circumferential bore 17, a circumferential shoulder 18 and a reduced circumferential bore 19 which is internally threaded as at 20.

Threadedly secured to the fitting 12 is the collar 13 having an externally threaded hollow shank portion 21 and an annular shoulder or flange 22 which is positioned in spaced relation to the bottom of fitting 12. The shank portion 21 of the collar is externally threaded along a major portion of its length but is unthreaded for a portion 23 adjacent the shoulder 22. Secured around the collar 13 adjacent the unthreaded portion 23 and resting on the shoulder 22 is an expansion gasket 24 made of rubber or similar material. A metal washer 25 is positioned on the gasket 24 below the fitting 12.

It will be seen that the outer wall of the fitting 12 and the outer wall of the collar 13 are spaced slightly with respect to the inner wall of the pipe 10 so that there is a free sliding fit between same so that the fitting and collar which forms the housing could be removed from the pipe 10. The lower portion of the collar 13 has an annular recessed portion which receives an expansion ring 26 which engages the inner wall of the pipe so as to resist rotation of the collar when the fitting 12 is rotated with respect thereto. By tightening the fitting 12 as by rotating it clockwise with respect to the collar 13, through a suitable tool engaging the slots 15 of the fitting, the space between the bottom of fitting 12 and shoulder 22 is reduced thus the expansion gasket 24 will be compressed pushing it outwardly against the wall of the pipe and frictionally locking the fitting 12 and collar 13 against removal from the pipe 10. By rotating the fitting counter-clockwise with respect to the collar the compression of the gasket is released and the pressure of the gasket against the pipe wall is released so that the fitting and collar may be withdrawn from the pipe. A ring member 27 is positioned inside the fitting 12 and rests on the shoulder 18.

Supported in the fitting 12 and collar 13 is a valve body generally indicated at 28 having an annular flange 29 and cylindrical depending body 30 having a tapered valve seat 31. The flange 29 has a pair of diametrically spaced cutouts or recesses 32 which when alined with the projections 16 permit the valve body to be inserted so that the flange can rest on the ring 27. A washer 33 is interposed therebetween. By rotating the valve body 28 relative to the projections 16 the valve body is secured to the fitting. Extending diametrically across the top of the valve body and on the same plane as the annular flange 29 is a bridge member or strip 34 which may be formed integrally with the valve body.

The bridge member is countersunk and has an aperture to receive a screw 35 which threadedly supports a guide member 36.

The lower end of the guide member 36 has an opening which slideably receives a stem 37 to which is secured the float valve 38. The stem has a head 39 to confine it in the guide member.

When water is passing down, the float valve 38 will be in its down position to permit passage through the valve body. However, any back pressure will cause the float valve to rise closing the valve body and prevent the backing up of the water.

Figs. 4, 4a and 4b illustrate a modified form of this invention.

The housing generally indicated at 39 comprises an upper portion or fitting 40 and a collar 41 secured thereto. The fitting has a pair of diametrically opposed slots 42 to be engaged by a tightening tool. It also has a pair of diametrically opposed projections or ears 43 and an annular shoulder 44 and an internally threaded portion 45 which threadedly engages the collar 41. The collar has a lower skirt portion 46 which defines a shoulder 47. The compression gasket 48 is positioned around the collar 41 and between the lower portion of the fitting 39 and the shoulder 47. Secured as at 49 to the skirt portion 46 are 4 spaced depending metal spring fingers 50 of the shape shown which are bent outwardly to form engaging surfaces 51 with the inner wall of the pipe and then are bent inwardly as at 52 to form a retaining member for the float ball valve 53.

The valve body 54 has an annular flange 55 provided with a pair of diametrically spaced slots 56 which permits insertion of the valve body through the projections 43. The flange 55 rests on a rubber washer seated on the shoulder 44. The flange 55 has a pair of cam shaped members 57 diametrically positioned on the flange. Each cam shaped member comprises a pair of sloping surfaces 58 and 59 which rise to a common point. By turning the valve body the cammed members engage the underside of the projections 43 to lock the valve body in the fitting. The valve body 54 has a valve seat 60 which is engaged by the float valve 53 when the back flow moves the float upwardly to block off any back flow through the pipe.

The fitting 40 is rotated clockwise with respect to the collar 41 by engaging the slots 42 through a suitable tool. The spring fingers 50 engaging the pipe 10 will resist rotation of the collar 41. The compression gasket 48 will be compressed against the pipe wall 10 and prevents removal of the housing. Rotation of the fitting 39 in the opposite direction will release the outward pressure of the compression gasket against the pipe wall and permit removal of the housing.

It will be understood that various changes and modifications may be made from the foregoing without departing from the spirit and scope of the appended claims.

I claim:

1. In a drain trap unit adapted for securement to a waste pipe, said unit comprising an upper member and a lower member, said upper and lower members each having threaded portions for engagement with each other to form a continuous wall, a compressible gasket positioned between said members in engagement with the inner wall of the waste pipe, said gasket having a substantial surface so that when compressed by the rotation of the upper member with respect to the lower member said gasket will expand laterally and lock itself against the wall of the waste pipe to prevent removal of said drain trap unit, said gasket forming the only means between said unit and said waste pipe for locking said unit to said waste pipe, a valve body within said unit having a valve seat and a float valve secured to said unit and cooperating with said valve seat for blocking the backflow from said waste pipe, cam means on said valve body to lock said valve body with respect to said unit.

2. In a drain trap unit adapted for securement to a waste pipe, said unit comprising a housing formed of an upper member and a lower member extending below the bottom of the upper member, means for connecting said upper and lower members to form a continuous connected wall so that said lower member forms an extension of the upper member, a compressible gasket positioned between said members in engagement with the inner wall of the waste pipe, said gasket having a substantial surface so that when compressed by the movement of the upper member with respect to the lower member said gasket will expand laterally to lock itself against the wall of the waste pipe to prevent removal of the drain trap unit, said gasket forming the only means between said unit and said waste pipe for locking said unit to said waste pipe, a valve body within said unit having a valve seat and a float valve secured to said unit and cooperating with said valve seat for blocking the backflow from said waste pipe, and cam means on said valve body to lock said valve body with respect to said unit.

3. In a drain trap unit adapted for securement to a waste pipe, said unit comprising a housing formed of an upper member and a lower member extending below the bottom of the upper member, said upper and lower members each having threaded portions for engagement with each other to form a continuous connected wall so that said lower member forms an extension of the upper member, a compressible gasket positioned between said members in engagement with the inner wall of the waste pipe, said gasket having a substantial surface so that when compressed by the rotation of the upper member with respect to the lower member said gasket will expand laterally to lock itself against the wall of the waste pipe to prevent removal of said drain trap unit, said gasket forming the only means between said unit and said waste pipe for locking said unit to said waste pipe, a valve body within said unit having a valve seat and a float valve secured to said unit and cooperating with said valve seat for blocking the back flow from said waste pipe, and means for securing said valve body to said unit, said means including a pair of cam shaped members on the upper portion of said valve body adapted to engage said unit.

4. In a structure defined in claim 2 in which the cam means on the valve body comprises a pair of cam members, each cam member having a pair of sloping surfaces which rise to a common point for engagement with a projection on the unit.

References Cited in the file of this patent

UNITED STATES PATENTS

| | | |
|---|---|---|
| 1,211,283 | Butler | Jan. 2, 1917 |
| 1,753,724 | Shaw | Apr. 8, 1930 |
| 2,476,434 | Spang | July 19, 1949 |
| 2,524,501 | Wilhelm | Oct. 3, 1950 |
| 2,758,664 | Koenig | Aug. 14, 1956 |